United States Patent Office 3,795,717
Patented Mar. 5, 1974

3,795,717
PROCESS FOR PRODUCING IMPROVED POLYESTER RESINS BY BLENDING MAGNESIUM OXIDE THEREWITH
Silvio Vargiu, Sesto S. Giovanni, Beppino Passalenti, and Ugo Nistri, Milan, Italy, assignors to Società Italiana Resine S.p.A. Milan-Via Breno, Milan, Italy
No Drawing. Filed June 30, 1971, Ser. No. 158,610
Claims priority, application Italy, July 1, 1970, 26,849/70
Int. Cl. C08f 21/02
U.S. Cl. 260—865         2 Claims

ABSTRACT OF THE DISCLOSURE

Unsaturated polyester compositions are blended with 0.001 to 0.05% by weight magnesium oxide and maintained at 40° to 70° C. for 0.2 to 3.0 hours to render them stable for storage and regulate the gel time.

---

The present invention concerns an improvement relating to unsaturated polyester, compositions which are the combinations of acrylic or vinyl monomers with the products which are obtained by polycondensing polycarboxylic acids and polyhydric alcohols when one or other class of compounds is unsaturated.

In order to avoid premature polymerization of unsaturated polyester resins, it is already known to use inhibitors, normally consisting of quaternary ammonium salts, such as for example halides, phosphates and acetates of trimethyl benzyl ammonium or trimethyl acetyl ammonium.

It is known that such substances have the additional function of shortening the gelling and setting times of polyester resins when the peroxide hardening catalysts are added to such resins.

The use of quaternary ammonium salts is not however satisfactory. For example, the accelerating action which they exert on the hardening of unsaturated polyesters is not unambiguous, in the sense that beyond certain limits, they have a retarding action and it is not always easy to determine the limits within which one or other effect prevails.

Thus, it can happen that the quantity of quaternary ammonium salts required to stabilize the unsaturated polyesters falls within the limits of concentration in which such salts exert a retarding action on the peroxide-catalysed setting. In any case, such salts give a yellowish or brown coloring to the hardened unsaturated polyesters, colorings which are all the more intense the higher is the concentration of the salt. It has now been found that all these disadvantages can be overcome by the method according to the present invention which consists essentially in blending the liquid unsaturated polyester with small quantities of magnesium oxide at temperatures above the ambient.

Under these conditions, the use of quantities of magnesium oxide ranging from 0.001 to 0.05% by weight of unsaturated polyester imparts stability to the polyester itself in that it prevents premature polymerization; furthermore, within the aforesaid limits, the magnesium oxide acts as a gel time regulator, a property the value of which increases with time, as is well known. In this way, it is possible partly or preferably completely to replace the quaternary ammonium salts used in the prior art, so avoiding the drawbacks inherent in the use of these salts.

The specific effect of the magnesium oxide is surprising in that such an effect is encountered in a far smaller degree in the oxides of other earth alkaline metals and furthermore it was known that the oxides of the earth alkaline metals, used within certain limits of concentration, have the effect of accelerating the setting of peroxide catalysed unsaturated polyester resin.

One advantage inherent in the use of magnesium oxide consists in the absence of coloring in the products of setting of unsaturated polyesters.

For the purposes of the present invention, it is possible to use unsaturated polyesters which, as is already known, are constituted by an acrylic or vinyl monomer in combination with the product of polycondensation obtained from polycarboxylic acids and polyhydric alcohols, unsaturation being present in one or other class of compounds.

Normally used are aryl vinyl compounds, particularly styrene, in combination with the products of polycondensation between saturated dihydric alcohols and unsaturated dicarboxylic acids, such as for example maleic, fumaric, itaconic and citraconic acids.

Also useful for the purposes of the present invention are the modified products obtained by addition in polycondensation of small quantities of monocarboxylic acids or monohydric alcohols or alcohols having more than two hydroxy groups per molecule or acids having more than two carboxyl groups per molecule.

Finally, the above-mentioned unsaturated carboxylic acids may be partially substituted by equivalent quantities of saturated carboxylic acids such as for example succinic, adipic, azelaic or phthalic acid.

In the unsaturated polyester, the quantity of acrylic or vinyl monomer is preferably between 20 and 70% by weight of the products of polycondensation.

This latter should furthermore have an acidity number comprised between 30 and 50, and a viscosity of T to U, the value being determined on the Gardner scale in a solution of 66% by weight of styrene.

Such characteristics can be obtained by measuring the relative quantities of the monomers and by regulating the conditions of polycondensation.

The unsaturated polyesters having the aforesaid characteristics, according to the method of the present invention, are blended with quantities of 0.001 to 0.05% by weight of magnesium oxide, and maintained at temperatures of 40 to 70° C. and for periods of 0.2 to 3.0 hours. In practice, the magnesium oxide is added to the unsaturated polyester and it is heated to within the range of temperatures mentioned until a clear solution is obtained.

It should be noted that the specific effects of the magnesium oxide are not revealed by the simple addition to the unsaturated polyester, the treatment described being vital.

It is therefore our opinion that such a compound becomes in some way linked with the unsaturated polyester.

By means of the treatment described, compositions of unsaturated polyesters are obtained which have periods of stability in excess of one year.

It is known that the gel time of unsaturated polyester resins increases undesirably with time. By means of the magnesium oxide treatment under the aforedescribed conditions, it is possible to obtain unsaturated polyester resin compositions which maintain the gel time virtually unaltered throughout the stability period. In addition, the treatment with magnesium oxide can be applied to those polyester resins which have aged and which have undesirably high gel times. In this way, it is possible to bring the level to within the limits desired.

It should also be noted that magnesium oxide does not help to raise the temperature of maximum exothermicity in the heat setting of unsaturated polyesters, as happens on the other hand when quaternary ammonium salts are used.

Finally, the fact that the magnesium oxide acts as an accelerator influencing the setting of unsaturated polyesters is advantageous in the process in question in that in the obtaining of products hardened by catalysis with peroxides, it is sufficient to increase the concentration of magnesium oxide.

EXAMPLE 1

In a flask fitted with a condenser, agitator, thermometer and a system for introducing inert gases, phthalic anhydride, maleic anhydride and propylene glycols are introduced in a molar ratio of 1:0.65:1.75.

Polymerization is carried out at temperatures from 160° to 200° C. until a product is obtained with a Gardner viscosity equal to T-T½ measured at 25° C. and in a toluene solution of 70% by weight, and with an acidity number of 45 to 50. The mixture is then cooled to 100° C. diluted with styrene containing 20 p.p.m. hydroquinone and 30 p.p.m. paratertiary butyl catechol so as to have a final viscosity equal to 910 cps. at 25° C. The gel time is then monitored and is shown to equal 18' at a temperature of 25° C.

In Example 1 and in those which follow, the viscosity is determined by means of Gardner and Hubbelhode viscosimeters. To monitor the gel time, the following method was used: to 100 g. resin are added 0.2 ml. cobalt octoate solution of 6% by weight of metal. The mixture is thermostatically controlled at 25° C. and 1.5 ml. methyl ethyl ketone peroxide (50%) are added, the mixture homogenized and measurement of the time is commenced.

The progress of viscosity is followed by means of a glass rod every 30 to 60 seconds.

The gel time is defined as that period of time which elapses from homogenization of the mixture with the peroxide, to the moment when the resin raised with the glass rod remains clinging to the rod.

EXAMPLE 2 (Comparative)

The resin prepared as described in Example 1 is subjected to accelerated ageing, the pattern of the gel time being monitored as a function of the time lapse.

For such ageing approx. 500 g. unsaturated polyester are placed in well-closed vessels which are kept in an ambient of 65° C.

From time to time, samples are taken, cooled to 25° C. and then subjected to gel time determination as described above.

The following results were obtained: initial gel time: 18', after 24 hours: 20', after two days: 26', after 6 days: 45'. It should be noted that 24 hours of ageing at 65° C. correspond to approximately one month at a temperature of 25° C.

EXAMPLE 3

The resin aged for six days at 65° C. as described in Example 2 is treated with various percentages of magnesium oxide. More precisely, the resin is heated to 50 to 55° C., the magnesium oxide is added and the mixture maintained at such temperatures and in a stream of nitrogen for 30'. It is then cooled to ambient temperature and the gel times determined. The following results were obtained: gel time in the absence of magnesium oxide: 45', with 0.005% by weight magnesium oxide: 39', with 0.01% magnesium oxide: 35', with 0.03% magnesium oxide: 25', with 0.05% magnesium oxide: 12'.

EXAMPLE 4

The unsaturated polyester prepared as described in Example 1 is used.

The gel time of such a polyester is regulated at 39' by means of paratertiary butyl catechol.

The polyester is then heated to 50 to 55° C. and magnesium oxide added in quantities equal to 0.025% by weight.

The mixture is maintained at such temperatures and in a nitrogen atmosphere for 30', after which it is cooled to ambient temperature. After treatment, the gel time is equal to 21'. A sample of polyester treated with magnesium oxide is maintained at 65° C. for five days. After this period, the gel time is equal to 20'.

EXAMPLE 5

To a sample of unsaturated polyester of the type used in Example 4, trimethyl benzyl ammonium chloride is added in quantities equal to 0.025% by weight. Thus, the gel time equals 14'. A sample of the polyester containing the quaternary ammonium salt is then maintained at 65° C. for five days. After this period, the gel time equals 20'.

EXAMPLE 6

The resin described in Example 1 is used, being treated with 0.01, 0.03 and 0.05% by weight of magnesium oxide for 30' at the temperature of 50 to 55° C. and in a nitrogen atmosphere. Samples of the product thus treated are stable at 65° C. for periods ranging from 10 to 13 days.

EXAMPLE 7

A sample of the unsaturated polyester described in the first example is treated with 0.025% by weight magnesium oxide at a temperature of 50 to 55° C., under nitrogen, for 30'. To 100 g. of the product thus obtained are added 0.2 ml. cobalt octoate of 6% by weight of metal and 1.5 ml. 50% peroxide methyl ethyl ketone.

The mixture is then poured into cylindrical vessels of 8 cm. diameter and a height of 0.5 cm. and allowed to gel at ambient temperature. After gelling, the mixture is treated for three hours at 100° C.

The hardened samples were perfectly transparent and revealed no coloring other than that imparted by the cobalt salt.

We claim:

1. A process for rendering unsaturated polyester compositions stable for storage and for regulating the gel time, comprising blending said unsaturated polyester compositions with a quantity of 0.001 to 0.05% by weight based on said unsaturated polyester compositions of magnesium oxide and maintaining said blend at temperatures of from 40 to 70° C. for periods of 0.2 to 3.0 hours, said unsaturated polyester compositions being a mixture of a condensation product of a polycarboxylic acid and a polyhydric alcohol, one or the other of which is unsaturated, having an acid number of from 30 to 50 and from 20 to 70% by weight of styrene based on the amount of said condensation product.

2. Unsaturated storage-stable polyester compositions characterized by the presence of 0.001 to 0.05% by weight based on said unsaturated polyester composition of magnesium oxide produced by the process comprising blending said unsaturated polyester composition with a quantity of 0.001 to 0.05% by weight based on said unsaturated polyester composition of magnesium oxide and maintaining said blend at temperatures of from 40 to 70° C. for periods of 0.2 to 3 hours, said unsaturated polyester composition being a mixture of a condensation product of a polycarboxylic acid and a polyhydric alcohol, one or the other of which is unsaturated, having an acid number of from 30 to 50 and from 20 to 70% by weight of vinyl monomer based on the amount of said condensation product.

References Cited

UNITED STATES PATENTS

| 2,628,209 | 2/1953 | Fisk | 260—865 |
| 3,631,217 | 12/1971 | Rabenold | 260—865 |

FOREIGN PATENTS

| 1,017,015 | 1/1966 | Great Britain | 260—865 |

WILLIAM H. SHORT, Primary Examiner

E. WOODBERRY, Assistant Examiner

U.S. Cl. X.R.

260—75 T